United States Patent
Reddy

(10) Patent No.: US 10,556,829 B1
(45) Date of Patent: Feb. 11, 2020

(54) CEMENT SLURRIES, CURED CEMENT AND METHODS OF MAKING AND USE OF THESE

(71) Applicant: Saudi Arabian Oil Company, Dhahran (SA)

(72) Inventor: B. Raghava Reddy, Pearland, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/426,092

(22) Filed: May 30, 2019

(51) Int. Cl.
C04B 28/04 (2006.01)
C04B 24/26 (2006.01)

(52) U.S. Cl.
CPC .......... C04B 24/2688 (2013.01); C04B 28/04 (2013.01); C04B 2201/52 (2013.01)

(58) Field of Classification Search
CPC .. C04B 24/2688; C04B 28/04; C04B 2201/52
USPC .......................................................... 524/8
See application file for complete search history.

(56) References Cited

U.S. PATENT DOCUMENTS

| | | | |
|---|---|---|---|
| 4,578,429 A | 3/1986 | Gergen et al. | |
| 5,597,865 A | 1/1997 | Jackson | |
| 5,779,787 A | 7/1998 | Brothers et al. | |
| 6,715,553 B2 | 4/2004 | Reddy et al. | |
| 6,722,434 B2 | 4/2004 | Reddy et al. | |
| 6,858,566 B1 | 2/2005 | Reddy et al. | |
| 6,962,201 B2 | 11/2005 | Brothers | |
| 6,992,048 B2 | 1/2006 | Reddy et al. | |
| 7,156,715 B2 | 1/2007 | Lee et al. | |
| 7,590,396 B2 | 9/2009 | Behzad et al. | |
| 7,647,970 B2 | 1/2010 | Mueller et al. | |
| 8,383,697 B2 | 2/2013 | Wilson et al. | |
| 8,800,656 B2 | 8/2014 | Le Roy-Delage et al. | |
| 8,844,628 B2 | 9/2014 | Le Roy-Delage et al. | |
| 8,911,549 B2 | 12/2014 | Jonkers | |
| 9,505,879 B2 | 11/2016 | Harumashi et al. | |
| 9,598,313 B2 | 3/2017 | Keung et al. | |
| 9,683,161 B2 | 6/2017 | Le Roy-Delage et al. | |
| 9,701,881 B2 | 7/2017 | Morris et al. | |
| 9,758,658 B2 | 9/2017 | Kim et al. | |
| 9,890,253 B2 | 2/2018 | Feng et al. | |
| 9,938,446 B2 | 4/2018 | Zha | |
| 2007/0037927 A1 | 2/2007 | Yang | |
| 2007/0232747 A1 | 10/2007 | Maris et al. | |
| 2014/0166285 A1 | 6/2014 | Santra et al. | |
| 2017/0173916 A1 | 6/2017 | Widenbrant et al. | |
| 2018/0037798 A1 | 2/2018 | Mishra | |

FOREIGN PATENT DOCUMENTS

| | | | |
|---|---|---|---|
| CN | 102746836 A | | 10/2012 |
| CN | 104181287 A | | 12/2014 |
| CN | 104419009 A | * | 3/2015 |
| CN | 104419009 A | | 3/2015 |
| CN | 104446609 A | * | 3/2015 |
| CN | 105315486 A | | 2/2016 |
| EP | 1311559 B1 | | 8/2006 |
| WO | 2012049334 A1 | | 4/2012 |
| WO | 2016008371 A1 | | 1/2016 |
| WO | 2017099154 A1 | | 6/2017 |
| WO | 2017187286 A1 | | 11/2017 |
| WO | 2010099260 A2 | | 9/2019 |

OTHER PUBLICATIONS

Nehdi, et al., "Cementitious Composites Containing Recycled Tire Rubber: An Overview of Engineering Properties and Potential Applications", American Society for Testing and Materials, Cement, Concrete and Aggregates, CCAGDP, 23, pp. 3-10, 2001.

* cited by examiner

*Primary Examiner* — Kelechi C Egwim
(74) *Attorney, Agent, or Firm* — Dinsmore & Shohl LLP

(57) ABSTRACT

Cement slurries, cured cements, and methods of making cured cement and methods of using cement slurries are provided. The cement slurries have, among other attributes, improved elasticity and self-healing properties and may be used, for instance, in the oil and gas drilling industry. The cement slurry comprises water, a cement precursor material, and a block copolymer composition. The block copolymer composition has at least one copolymer backbone, with each copolymer backbone comprising at least two hard segments. Furthermore, a soft segment is disposed between the at least two hard segments. The copolymer backbone has at least one anhydride group grafted onto the soft segment, and the anhydride group is crosslinked by an aminosilane crosslinker.

20 Claims, No Drawings

CEMENT SLURRIES, CURED CEMENT AND METHODS OF MAKING AND USE OF THESE

TECHNICAL FIELD

Embodiments of the present disclosure generally relate to cement slurries and methods of making and using cement slurries and to cured cements and methods of making cured cement.

BACKGROUND

Cement slurries are used in the oil and gas industries, such as for cementing in oil and gas wells. Primary, remedial, squeeze, and plug cementing techniques can be used, for instance, to place cement sheaths in an annulus between casing and well formations, for well repairs, well stability, or for well abandonment (sealing an old well to eliminate safety hazards). These cement slurries must be able to consistently perform over a wide range of temperatures and conditions as cement set in an oil and gas well may be vulnerable to cyclic stresses imposed by pressure and temperature fluctuations. A brittle cement may crack and break under these stresses, reducing the integrity of the wellbore.

SUMMARY

Adding elastomers to cement slurry can be vital to the elasticity, strength, and performance properties of the cured cement composition. However, conventional aqueous latex fluids contain limited amounts of elastomer additive, leading to too little elastomer throughout the set cement, as adding too much aqueous fluid can lead to an inability for the cement to set. Furthermore, too little elastomer leads to cured cements without self-healing capabilities.

Accordingly, there is an ongoing need for cement slurries that are resistant to cyclic stresses, elastic in nature, and exhibit self-healing capabilities. Furthermore, cured cements that are elastic prevent cracking and breaking under cyclic stresses. The present embodiments address these needs by providing cement slurries and methods of making and using cement slurries that include a block copolymer composition.

In one embodiment, a cement slurry is provided that comprises water, a cement precursor material, and a block copolymer composition. The block copolymer composition has at least one copolymer backbone, with each copolymer backbone comprising at least two hard segments. Furthermore, a soft segment is disposed between the at least two hard segments. The copolymer backbone has at least one anhydride group grafted onto the soft segment, and the copolymer backbone is crosslinked by an aminosilane crosslinker.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "block copolymer" refers to a polymer having at least two compositionally distinct subunits (A and B) derived from different monomer species. The at least two compositionally distinct subunits are covalently bonded to one another and linearly oriented.

As used throughout this disclosure, the term "polymer backbone" or "copolymer backbone," which may also be called "the main chain," is the linearly-oriented polymeric chain to which all side chains or moieties are attached or grafted to.

As used throughout this disclosure, the term "grafting" refers to a reaction in which one or more compositions are connected to the main chain or polymer backbone as a side chain in which the grafted composition is compositionally different than the polymer backbone.

As used throughout this disclosure, the term "crosslinking" refers to the covalent bonding of a first polymeric chain with a second polymeric chain using a crosslinking agent.

As used throughout this disclosure, the terms "soft segment" and "hard segment" refer to relative block portions (or blocks) of the polymer chain. The soft segment is the block portion of the polymer chain that if it was in a pure homopolymer form would have a reduced glass transition temperature and would have lesser rigidity relative to that of a similar pure homopolymer form of the block hard segment.

As used throughout this disclosure, the term "cement slurry" refers to a composition comprising a cement precursor that is mixed with at least water to form cement. The cement slurry may contain calcined alumina ($Al_2O_3$), silica ($SiO_2$), calcium oxide (CaO, also known as lime), iron oxide (FeO), magnesium oxide (MgO), clay, sand, gravel, and mixtures of these.

As used throughout this disclosure, "curing" refers to providing adequate moisture, temperature and time to allow the concrete to achieve the desired properties (such as hardness) for its intended use through one or more reactions between the water and the cement precursor material.

As used throughout this disclosure, "drying" refers to merely allowing the cement to achieve a moisture condition appropriate for its intended use, which may only involve physical state changes as opposed to chemical reactions.

As used throughout this disclosure, the term "retarder" refers to a chemical agent used to increase the thickening time of cement slurries to enable proper placement of the cement slurry within the wellbore. The need for cement retardation increases with depth due to the greater time required to complete the cementing operation and the effect of increased temperature on the cement-setting process.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a cement slurry remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bearden units of consistency (Bc), a dimensionless quantity with no direction conversion factor to more common units of viscosity. The Bearden units of consistency is measured on a scale from 1 to 100 where difficult pumping begins at 50 Bc and cement is completely set at 100 Bc.

As used throughout this disclosure, the term "wellbore" refers to the drilled hole or borehole, including the openhole or uncased portion of the well. Borehole may refer to the void space defined by the wellbore wall, where the rock face that bounds the drilled hole defines the borehole.

Embodiments of the present disclosure relate to cement slurries and cured cements with elasticity and self-healing capabilities. Embodiments of the present disclosure also relate to methods of producing and using cement slurries, in some particular embodiments, for use in the oil and gas industries.

Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure.

In some instances, a casing may be inserted into the wellbore. The casing may be a pipe which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid. The spacer fluid displaces and removes the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

To ensure the stability and safety of a well, it is important that the cured cement maintains integrity and isolates the wellbore from the surrounding subsurface formations. If the cement cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid loss from the wellbore into the surrounding subsurface formation or in decreased wellbore pressure, possibly leading to a well control event. Therefore, wellbore integrity and isolation are critical to effective production and use of a wellbore.

The present disclosure provides cement slurries and cured cements which may have, among other attributes, elasticity and self-healing capabilities to address these concerns. The cement slurry of the present disclosure includes water, a cement precursor material, and a block copolymer composition. The block copolymer composition has at least one copolymer backbone, where each copolymer backbone further includes at least two hard segments and a soft segment disposed between the two hard segments. The copolymer backbone is further grafted with an anhydride group on the soft segment, and the anhydride group is crosslinked by an aminosilane crosslinker. In some embodiments, the aminosilane crosslinker may include 3 (2 aminoethylaminopropyl)trimethoxysilane, 3-aminopropyltriethoxysilane, or combinations of these.

The cement precursor material may be any suitable material which, when mixed with water, can be cured into a cement. The cement precursor material may be a hydraulic or a non-hydraulic cement precursor. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an interground addition.

The cement precursor material may include calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), hexavalent chromium, trivalent chromium, calcium aluminate, silica sand, silica flour, hematite, manganese tetroxide, or combinations of these. The cement precursor material may include Portland cement, siliceous fly ash, calcareous fly ash, slag cement, silica fume, quartz, or combinations of any of these. Silica flour is a finely ground crystalline silica with a molecular formula of $SiO_2$ and with a grain size ranging from 1 to 500 microns (μm), from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

Water may be added to the cement precursor material to produce the slurry. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, vanadium, zirconium, or combinations of these.

In some embodiments, the cement slurry may contain from 10 weight percent (wt. %) to 70 wt. % by weight of cement precursor (BWOC) water. In some embodiments, the cement slurry may contain from 10 wt. % to 40 wt. %, from 10 wt. % to 30 wt. %, from 10 wt. % to 20 wt. %, from 20 wt. % to 40 wt. %, from 25 wt. % to 35 wt. %, or from 20 wt. % to 30 wt. % BWOC water. The cement slurry may contain 30 wt. % BWOC water.

Along with the cement precursor material and water, the cement slurry includes a block copolymer composition. The block copolymer composition functions as an elastomer, which imparts elasticity and self-healing capabilities to the cement. The block copolymer composition may melt at a specific temperature range, known as the melting temperature, resulting in a flowable medium. The block copolymer composition may resolidify upon cooling to less than the melting temperature. This behavior differs from the behavior of conventional elastomers, such as rubber.

The non-crosslinked block copolymer may function as a thermoplastic elastomer, improving the elasticity of the block copolymer proppant coating. In embodiments, the crosslinked block copolymer may function as a thermoset elastomer. In embodiments, the crosslinked block copolymer may include thermoreversible crosslinking.

In embodiments where block copolymer is not crosslinked, the block copolymer composition may melt at a specific temperature range, known as the melting temperature, resulting in a flowable medium. The block copolymer composition may resolidify upon cooling to less than the melting temperature.

In embodiments where the crosslinked block copolymer includes thermoreversible crosslinking, the crosslinks may reverse at the melting temperature, resulting in a flowable medium. The crosslinks may reform upon cooling to less than the melting temperature, such that the block copolymer composition may resolidify upon cooling to less than the melting temperature, and is once again crosslinked.

This cyclic process may be repeated an unlimited number of times, meaning that the block copolymer proppant coating may serve as a solid proppant coating at temperatures less than the melting temperature. Furthermore, this means the block copolymer proppant coating may melt when temperature increases to at or greater than the melting temperature, and may return to a solid block copolymer proppant coating when the temperature decreases to less than the melting temperature. This behavior differs from the behavior of conventional thermoset rubbers. Conventional thermoset rubbers are single phase materials with non-reversible chemical bonds which cannot be molten or melt-processed.

The crosslinked block copolymer may demonstrate rubbery elasticity, but may not undergo plastic deformation due to the matrix structure of the crosslinked block copolymer. Furthermore, the crosslinked block copolymer may be a thermoplastic elastomer, and therefore may not melt at temperatures of at least 100° C., of at least 150° C., of at least 200° C., of at least 250° C., of at least 300° C., of at least 350° C., or of at least 400° C. Without being bound by theory, the crosslinked block copolymer may not dissolve if exposed to hydrocarbons or aqueous-based solutions. Rather, the crosslinked block copolymer may swell by from 0.5 to 6 wt. %, from 0.5 to 5 wt. %, from 0.5 to 4.5 wt. %, from 0.5 to 4 wt. %, from 0.5 to 3.5 wt. %, from 0.5 to 3 wt. %, from 0.5 to 2.5 wt. %, from 2 to 6 wt. %, from 2 to 5 wt. %, from 2 to 4.5 wt. %, from 2 to 4 wt. %, from 2 to 3.5 wt. %, from 2 to 3 wt. %, from 2 to 2.5 wt. %, from 2.5 to 6 wt. %, from 2.5 to 5 wt. %, from 2.5 to 4.5 wt. %, from 2.5 to 4 wt. %, from 3 to 6 wt. %, from 3 to 5 wt. %, from 3 to 4.5 wt. %, from 3 to 4 wt. %, from 3 to 3.5 wt. %, from 3.5 to 6 wt. %, from 3.5 to 5 wt. %, from 3.5 to 4.5 wt. %, from 3.5 to 4 wt. %, from 4 to 6 wt. %, from 4 to 5 wt. %, from 4 to 4.5 wt. %, from 4 to 6 wt. %, from 4.5 to 5 wt. %, or from 5 to 6 wt. % if exposed to hydrocarbons.

The block copolymer functions as a thermoplastic elastomer because the hard segments and the soft segments have different glass transition temperatures. As used in the present application, "segments" and "blocks" are used interchangeably. Glass transition is the gradual and reversible transition in amorphous materials (or in amorphous regions within semicrystalline materials), from a hard and relatively brittle "glassy" state into a viscous or rubbery state as temperature is increased. The glass-transition temperature, $T_g$, of a material characterizes the range of temperatures over which this glass transition occurs. The glass-transition temperature of a homopolymer material (that is, a consisting of identical monomer units) is less than the melting temperature, $T_m$, of the crystalline state of the homopolymer material.

The soft segment has a glass transition temperature less than the glass transition temperature of the hard segments. In many cases, a homopolymer including the soft segment has a $T_g$ of less than 20° C., and the hard segments have a $T_g$ of at least 80° C., of at least 90° C., of at least 100° C., of at least 150° C., of at least 200° C., of at least 250° C., of at least 300° C., of at least 350° C., or of at least 400° C.

In many cases, a homopolymer including the hard segments may have a $T_g$ of from 80° C. to 400° C., from 80° C. to 350° C., from 80° C. to 300° C., from 80° C. to 250° C., from 80° C. to 200° C., from 80° C. to 150° C., from 80° C. to 100° C., from 80° C. to 90° C., from 90° C. to 400° C., from 90° C. to 350° C., from 90° C. to 300° C., from 90° C. to 250° C., from 90° C. to 200° C., from 90° C. to 150° C., from 90° C. to 100° C., from 100° C. to 400° C., from 100° C. to 350° C., from 100° C. to 300° C., from 100° C. to 250° C., from 100° C. to 200° C., from 100° C. to 150° C., from 150° C. to 400° C., from 150° C. to 350° C., from 150° C. to 300° C., from 150° C. to 250° C., from 150° C. to 200° C., from 200° C. to 400° C., from 200° C. to 350° C., from 200° C. to 300° C., from 200° C. to 250° C., from 250° C. to 400° C., from 250° C. to 350° C., from 250° C. to 300° C., from 300° C. to 400° C., from 300° C. to 350° C., or from 350° C. to 400° C.

Furthermore, the hard segments may comprise at least one aromatic moiety. Specifically, the hard segments may comprise the polymerized product of at least one monomer selected from styrene, alpha-methyl styrene, methacrylate, polyamide, and polyamine.

As used in the present application, the block copolymer is a polymer having at least two compositionally distinct subunits (A and B) derived from different monomer species. In one or more embodiments, these segments may comprise oligomers or homopolymers. In another embodiment, a block copolymer may have at least three different subunits, A, B, and C in the block copolymer backbone. As used in the present application, "segments" and "blocks" may occasionally be used interchangeably as "sub-units", but not in most instances. For example, a block copolymer may have an A-B-A structure, which means there only two compositionally distinct sub-units A and B; however, there are three segments of the polymer backbone with two of the three segments (such as the A segments) having the same composition (a triblock copolymer). As noted previously, in some embodiments, the block copolymer composition comprises at least one anhydride group grafted onto the block copolymer backbone. In further embodiments, these anhydrides may be crosslinked by an amine-containing crosslinker.

The block copolymer composition includes at least one copolymer backbone. Each copolymer backbone comprises at least two hard segments and a soft segment. The hard segments may be the end blocks of the block copolymer. Alternatively, the copolymer backbone may comprise more than one soft segment, and these soft segments may be the end blocks of the block copolymer. In some embodiments, the block copolymer has at least two hard segments and at least one soft segment, where one of the at least one soft segments is disposed between two of the at least two hard segments. In some embodiments, the two hard segments are disposed as the end blocks of the block copolymer. In some embodiments, there are more than one soft segments between the two hard segments disposed as the end blocks of the block copolymer. In some embodiments, only one of the two hard segments are disposed as the end block of the block copolymer. In some embodiments, none of the hard segments are disposed as the end blocks of the block copolymer backbone. In some such embodiments, two soft segments are disposed as the end blocks of the block copolymer.

As stated previously, each copolymer backbone comprises at least two hard segments and a soft segment. The soft segment is disposed between the at least two hard segments. The soft segment may be aliphatic. In some embodiments, the soft segment comprises the polymerized product of one or more monomers selected from butene, butadiene, ethylene, tetrahydrofuran, ethylene oxide, propylene oxide, and acrylic acid. The soft segment may be unsaturated. The soft segment may have a glass transition temperature of from −100° C. to −50° C., from −100° C. to −55° C., from −100° C. to −60° C., from −100° C. to −65° C., from −100° C. to −70° C., from −100° C. to −75° C., from −100° C. to −80° C., from −100° C. to −85° C., from −100° C. to −90° C., from −100° C. to −95° C., from −95° C. to −80° C., from −95° C. to −85° C., from −95° C. to −90° C., from −90° C. to −80° C., from −90° C. to −85° C., from −80° C. to −50° C., from −80° C. to −55° C., from −80° C. to −60° C., from −80° C. to −65° C., from −80° C. to −70° C., from −80° C. to −75° C., from −75° C. to −50° C., from −75° C. to −55° C., from −75° C. to −60° C., from −75° C. to −65° C., from −75° C. to −70° C., from −70° C. to −50° C., from −70° C. to −55° C., from −70° C. to −60° C., from −70° C. to −65° C., from −65° C. to −50° C., from −65° C. to −55° C., from −65° C. to −60° C., from −60° C. to −50° C. C., from −60° C. to −55° C., from −100° C. to 20° C., from −80° C. to 20° C., from −60° C. to 20° C., from −40° C. to 20° C., from −20° C. to 20° C., from 0° C. to 20° C., from 10° C. to 20° C., from −100° C. to 10° C., from −80° C. to 10° C., from −60° C. to 10° C., from −40° C. to 10° C., from −20° C. to 10° C., from 0° C. to 10° C., from −100° C. to 0° C., from −80° C. to 0° C., from −60° C. to 0° C., from −40° C. to 0° C., from −20° C. to 0° C., from −100° C. to −20° C., from −80° C. to −20° C., from −60° C. to −20° C., from −40° C. to −20° C., or from −60° C. to −40° C.

Furthermore, the copolymer backbone has at least one anhydride group grafted onto the soft segment. The anhydride group may be grafted onto one of a secondary carbon or a tertiary carbon of the soft segment. In some embodiments, the anhydride group comprises a succinic anhydride group, a maleic anhydride group, or combinations thereof. Specifically, the block copolymer having at least one anhydride group grafted onto the soft segment may be a SEBS block copolymer and comprise this formula:

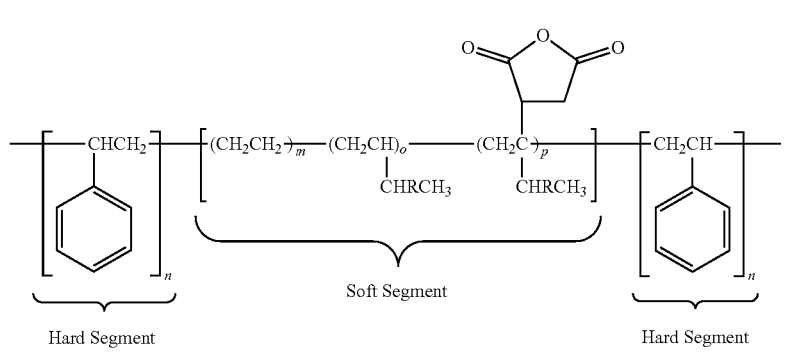

Formula 1

In some embodiments, the block copolymer may comprise styrene-ethylene-butylene-styrene (SEBS) block copolymer, a linear triblock copolymer including two styrene blocks and an ethylene/butylene block. The SEBS block copolymer may have a polystyrene content of from 10 to 40 wt. %, from 10 to 35 wt. %, from 10 to 30 wt. %, from 10 to 25 wt. %, from 10 to 20 wt. %, from 10 to 15 wt. %, from 13 to 40 wt. %, from 13 to 35 wt. %, from 13 to 30 wt. %, from 13 to 25 wt. %, from 13 to 20 wt. %, from 13 to 15 wt. %, from 15 to 40 wt. %, from 15 to 35 wt. %, from 15 to 30 wt. %, from 15 to 25 wt. %, from 15 to 20 wt. %, from 20 to 40 wt. %, from 20 to 35 wt. %, from 20 to 30 wt. %, from 20 to 25 wt. %, from 25 to 40 wt. %, from 25 to 35 wt. %, from 25 to 30 wt. %, from 30 to 40 wt. %, from 30 to 35 wt. %, from 35 to 40 wt. %, of 30 wt. %, or of 13 wt. %. The SEBS block copolymer may have a specific gravity of from 0.8 to 0.95, from 0.8 to 0.9, from 0.85 to 0.95, from 0.85 to 0.9, from 0.9 to 0.95, or of 0.91.

In other embodiments, the block copolymer may comprise polyether block amide (PEBA) block copolymer. PEBA block copolymer is obtained by polycondensation of a carboxylic acid polyamide with an alcohol termination polyether, resulting in HO—(CO-PA-CO—O-PE-O)$_n$—H, where PA is a polyamide and PE is a polyether. PEBA block copolymer is commercially available as VESTAMID, produced by Evonik Corporation.

The cement slurry may include from 0.1 to 10 wt. %, from 0.1 to 8 wt. %, from 0.1 to 7 wt. %, from 0.1 to 5 wt. %, from 0.1 to 3 wt. %, from 0.1 to 2 wt. %, from 0.1 to 1 wt. %, from 0.1 to 0.5 wt. %, from 0.5 to 10 wt. %, from 0.5 to 8 wt. %, from 0.5 to 7 wt. %, from 0.5 to 5 wt. %, from 0.5 to 3 wt. %, from 0.5 to 2 wt. %, from 0.5 to 1 wt. %, from 1 to 10 wt. %, from 1 to 8 wt. %, from 1 to 7 wt. %, from 1 to 5 wt. %, from 1 to 3 wt. %, from 1 to 2 wt. %, from 2 to 10 wt. %, from 2 to 8 wt. %, from 2 to 7 wt. %, from 2 to 5 wt. %, from 2 to 3 wt. %, from 3 to 10 wt. %, from 3 to 8 wt. %, from 3 to 7 wt. %, from 3 to 5 wt. %, from 5 to 10 wt. %, from 5 to 8 wt. %, from 5 to 7 wt. %, from 4 to 6 wt. %, or 5 wt. % BWOC block copolymer composition. The cement slurry may include 5.2 wt. % BWOC block copolymer composition.

The block copolymer composition may comprise from 0 to 10 wt. %, from 0 to 5 wt. %, from 0 to 3 wt. %, from 0 to 2 wt. %, from 0 to 1.5 wt. %, from 0 to 1 wt. %, from 0 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % anhydride group. The block copolymer composition may comprise from 1.4 to 2 wt. % anhydride group.

Lastly, the copolymer backbone may be crosslinked. A crosslinker is a substance or agent that induces the subsurface formation of crosslinks. Mixing a block copolymer with a crosslinker results in a chemical reaction that crosslinks the block copolymer. Without intending to be bound by theory, crosslinking prevents the block copolymer from melting, and increases the elasticity of the block copolymer while retaining the bond between the block copolymer and cured cement. Specifically, the block copolymer and the cured cement are bonded through both ionic bonds between the carboxylate groups of the block copolymer the calcium ions of the cured cement, and covalent bonds between the hydrolyzed siloxy group of the crosslinker and the hydroxyl groups of the silicates in the cement. In this way, the degree of crosslinking directly affects both the internal structure and strength of the cured cement and the swelling capabilities of the cement. The degree of crosslinking, reflected by the swelling values, can be controlled by the amount of the crosslinker added and the crosslinking duration and temperature. The degree of crosslinking provides a desired balance between the self-healing ability and cyclic stress. In some embodiments, the crosslinker may comprise hexamethylenetetramine, paraformaldehyde, oxazolidines, melamine resins, aldehyde donors, resole polymers, aminosilane, or combinations of these.

In some embodiments, the crosslinker may be an aminosilane crosslinker. The aminosilane may comprise at least one of 3-(2-aminoethylaminopropyl)trimethoxysilane and 3-aminopropyltriethoxysilane. The block copolymer composition may comprise from 0 to 5 wt. %, from 0 to 3 wt. %, from 0 to 2 wt. %, from 0 to 1.5 wt. %, from 0 to 1 wt. %, from 0 to 0.5 wt. %, from 0.5 to 5 wt. %, from 0.5 to 3 wt. %, from 0.5 to 2 wt. %, from 0.5 to 1.5 wt. %, from 0.5 to 1 wt. %, from 1 to 5 wt. %, from 1 to 3 wt. %, from 1 to 2 wt. %, from 1 to 1.5 wt. %, from 1.5 to 5 wt. %, from 1.5 to 3 wt. %, from 1.5 to 2 wt. %, from 2 to 5 wt. %, from 2 to 3 wt. %, or from 3 to 5 wt. % aminosilane. The block copolymer composition may comprise 1 wt. %, 1.3 wt. %, or 1.4 wt. % aminosilane.

The uncrosslinked block copolymer composition may have a melting temperature of from 150° C. to 250° C., from 150° C. to 240° C., from 150° C. to 230° C., from 150° C. to 220° C., from 150° C. to 210° C., from 170° C. to 250° C., from 170° C. to 240° C., from 170° C. to 230° C., from 170° C. to 220° C., from 170° C. to 210° C., from 180° C. to 250° C., from 180° C. to 240° C., from 180° C. to 230° C., from 180° C. to 220° C., from 180° C. to 210° C., from 190° C. to 250° C., from 190° C. to 240° C., from 190° C. to 230° C., from 190° C. to 220° C., from 190° C. to 210° C., from 200° C. to 250° C., from 200° C. to 240° C., from 200° C. to 230° C., from 200° C. to 220° C., or from 200° C. to 210° C.

The uncrosslinked block copolymer composition may have a melt flow index of from 10 to 50 grams per 10 minutes (g/10 min), from 10 to 45 g/10 min, from 10 to 40 g/10 min, from 10 to 35 g/10 min, from 10 to 30 g/10 min, from 10 to 25 g/10 min, from 10 to 20 g/10 min, from 10 to 15 g/10 min, from 15 to 50 g/10 min, from 15 to 45 g/10 min, from 15 to 40 g/10 min, from 15 to 35 g/10 min, from 15 to 30 g/10 min, from 15 to 25 g/10 min, from 15 to 20 g/10 min, from 20 to 50 g/10 min, from 20 to 45 g/10 min, from 20 to 40 g/10 min, from 20 to 35 g/10 min, from 20 to 30 g/10 min, from 20 to 25 g/10 min, from 25 to 50 g/10 min, from 25 to 45 g/10 min, from 25 to 40 g/10 min, from 25 to 35 g/10 min, from 25 to 30 g/10 min, from 30 to 50 g/10 min, from 30 to 45 g/10 min, from 30 to 40 g/10 min, from 30 to 35 g/10 min, from 35 to 50 g/10 min, from 35 to 45 g/10 min, from 35 to 40 g/10 min, from 40 to 50 g/10 min, from 40 to 45 g/10 min, of 40 g/10 min, or of 22 g/10 min, measured at 230° C. by ASTM D1238.

The cement slurry may have a density of from 10 to 20 pounds per gallon (ppg), from 10 to 17 ppg, from 10 to 16 ppg, from 10 to 15 ppg, from 12 to 20 ppg, from 12 to 17 ppg, from 12 to 16 ppg, from 12 to 15 ppg, from 14 to 20 ppg, from 14 to 17 ppg, from 14 to 16 ppg, from 14 to 15 ppg, from 15 to 20 ppg, from 15 to 17 ppg, from 15 to 16 ppg, or of 15 ppg.

In some embodiments, the cement slurry may contain at least one additive other than the block copolymer composition. The one or more additives may be any additives known to be suitable for cement slurries. As non-limiting examples, suitable additives may include accelerators, retarders, extenders, suspending agents, weighting agents, fluid loss control agents, lost circulation control agents, surfactants, antifoaming agents, and combinations of these. The suspending agents may include at least one of a copolymer of N,N-dimethylacrylamide and sodium 2-acrylamido-2-methyl propane sulfonate, and hydroxyethyl cellulose.

In some embodiments, the cement slurry may contain from 0.1 to 10% BWOC of the one or more additives based on the total weight of the cement slurry. For instance, the cement slurry may contain from 0.1 to 8% BWOC of the one or more additives, from 0.1 to 5% BWOC of the one or more additives, or from 0.1 to 3% BWOC of the one or more additives. The cement slurry may contain from 1 to 10% BWOC of the one or more additives, from 1 to 8% BWOC, from 1 to 5% BWOC, or from 1 to 3% BWOC of the one or more additives. In some embodiments, the cement slurry may contain from 3 to 5% BWOC, from 3 to 8% BWOC, from 3 to 10% BWOC, or from 5 to 10% BWOC of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, or combinations of any of these. Without being bound by any particular theory, in some embodiments, the anionic groups on the dispersant may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of turbulence at lesser pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the cement slurry and may, in some embodiments, cause additional retardation effects.

In some embodiments, the cement slurry may contain from 0.1% BWOC to 10% BWOC of one or more fluid loss additives, the one or more dispersants, or both. The cement slurry may contain from 0.02 to 90 pounds per barrel (lb/bbl) of the fluid loss additives, the one or more dispersants, or both based on the total weight of the cement slurry. For instance, the cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

Embodiments of the disclosure also relate to methods of producing the cement slurries previously described. In some embodiments, the method for producing a cement slurry may include mixing water with a cement precursor material and block copolymer composition to produce a cement slurry. The water, cement precursor material, and block copolymer composition may be in accordance with any of the embodiments previously described. The cement slurry may include one or more additives, including but not limited to defoamers, dispersants, and fluid loss additives. The mixing step, in some embodiments, may involve shearing the water, cement precursor material, block copolymer composition, and, optionally, other additives at a suitable speed for a suitable period of time to form the cement slurry. In one embodiment, the mixing may be done in the lab using a standard API blender for 15 seconds at 4,000 rotations per minute (RPM) and 35 seconds at 12,000 RPM. The equation of mixing energy is:

$$\frac{E}{M} = \frac{k\omega^2 t}{V} \qquad \text{EQUATION 1}$$

where
E=Mixing energy (kiloJoules)
M=Mass of slurry (kilograms)
k=6.1×10$^{-8}$ meters to the fifth power per second (constant found experimentally)
ω=Rotational speed (radians/s)
t=Mixing time (seconds)
V=Slurry volume (cubic meters)

The method of producing the cement slurry may further include crosslinking the block copolymer composition with an aminosilane as previously discussed. The block copolymer composition may be crosslinked at a temperature of from 100° F. to 300° F., from 100° F. to 200° F., from 100 to 150° F., from 100 to 180° F., from 150° F. to 200° F., from 150° F. to 180° F., from 180° F. to 200° F., or at 180° F. Crosslinking the block copolymer composition may include rolling the block copolymer composition in a roller oven for from 1 to 10 hours (hrs), from 1 to 8 hrs, from 1 to 5 hrs, from 1 to 4 hrs, from 1 to 3 hrs, from 1 to 2 hrs, from 2 to 10 hrs, from 2 to 8 hrs, from 2 to 5 hrs, from 2 to 4 hrs, from 2 to 3 hrs, from 3 to 10 hrs, from 3 to 8 hrs, from 3 to 5 hrs, from 3 to 4 hrs, from 4 to 10 hrs, from 4 to 8 hrs, from 4 to 5 hrs, from 5 to 10 hrs, from 5 to 8 hrs, or from 8 to 10 hrs.

Further embodiments of the present disclosure relate to methods of using the cement slurries previously described. In some embodiments, the method may include pumping the cement slurry into a location to be cemented and curing the cement slurry by allowing the water and the cement precursor material to react. The location to be cemented may, for instance, be a well, a wellbore, or an annulus.

Cementing is performed when the cement slurry is deployed into the well via pumps, displacing the drilling fluids still located within the well and replacing them with cement. The cement slurry flows to the bottom of the wellbore through the casing, which will eventually be the conduit through which the hydrocarbons flow to the surface. From there, the cement slurry fills in the space between the casing and the wellbore wall, and hardens. This creates a seal so that outside materials cannot enter the well flow as well as permanently positions the casing in place. In preparing a well for cementing it is important to establish the amount of cement required for the job. This may be done by measuring the diameter of the borehole along its depth using a caliper log. Utilizing both mechanical and sonic means, multi-finger caliper logs measure the diameter of the well at numerous locations simultaneously in order to accommodate for irregularities in the wellbore diameter and determine the volume of the open hole.

In some embodiments, curing the cement slurry may refer to passively allowing time to pass under suitable conditions upon which the cement slurry may harden or cure through allowing one or more reactions between the water and the cement precursor material. Suitable conditions may be any time, temperature, pressure, or humidity known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the cement precursor, or a combination of these. Usually, the cement will be cured and convert from slurry to solid due to subsurface formation conditions, temperature, and pressure. In the laboratory, a curing chamber capable of applying temperature and pressure is used for curing the cement specimens at required conditions. Cylindrical molds (2 inch diameter and 5 inch length) were lowered into the curing chamber. Pressures and temperatures were maintained until shortly before the end of the curing where they were reduced to ambient conditions.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., greater than or equal to 120° F., or greater than or equal to 180° F. The cement slurry may be cured at temperatures of from 50° F. to 250° F., or from 50° F. to 200° F., or from 50° F. to 150° F., or from 50° F. to 120° F., or from 50° F. to 180° F. In some instances, the temperature may be as great as 200° F., 300° F., 400° F., or 500° F. The cement slurry may be cured at pressures of greater than or equal to 20 pounds per square inch (psi), greater than or equal to 200 psi, greater than or equal to 500 psi, greater than or equal to 1000 psi, greater than or equal to 2000 psi, or greater than or equal to 3000 psi. The cement slurry may be cured at pressures of from 20 psi to 5000 psi, or from 200 psi to 5000 psi, or from 200 psi to 3000 psi, or from 500 psi to 2000 psi, or from 500 psi to 3000 psi. In some instances, the pressure may be as great as 1000 psi, 2000 psi, 3000 psi, 5000 psi, or 10000 psi. The cement slurry may be cured for from 1 day to 14 days, such as from 3 to 14 days, or from 5 to 14 days, or from 7 to 14 days, or from 1 to 4 days, or from 4 to 7 days.

Further embodiments of the present disclosure relate to particular methods of cementing a casing in a wellbore. The method may include pumping a cement slurry into an annulus between a casing and a wellbore and curing the cement slurry. The cement slurry may be in accordance with any of the embodiments previously described. Likewise, curing the cement slurry may be in accordance with any of the embodiments previously described. As stated previously, cementing is performed when the cement slurry is deployed into the well via pumps, displacing the drilling fluids still located within the well and replacing them with cement. The cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

Embodiments of the disclosure also relate to methods of producing cured cements. The method may include combining water with a cement precursor material and a block copolymer composition having at least one copolymer backbone. Each copolymer backbone comprises at least two hard segments and a soft segment disposed between the at least two hard segments in which the copolymer backbone has at least one anhydride group grafted onto the soft segment, and in which the copolymer backbone is crosslinked by an aminosilane crosslinker. The cement slurry may be in accordance with any of the embodiments previously described. The method may include curing the cement slurry by allowing for a reaction between the water and the cement precursor material to produce cured cement. The curing step may be in accordance with any of the embodiments previously described.

In some embodiments, cement is composed of four main components: tricalcium silicate ($Ca_3O_5Si$), which contributes to the early strength development; dicalcium silicate ($Ca_2SiO_4$), which contributes to the final strength, tricalcium aluminate ($Ca_3Al_2O_6$), which contributes to the early strength; and tetracalcium alumina ferrite. These phases are sometimes called alite and belite respectively. In addition, gypsum may be added to control the setting time of cement.

Cement slurry design is based on altering the hydration reactions by adding or removing specific additives. In one embodiment, the silicates phase in cement may be about 75-80 wt. % of the total material. $Ca_3O_5Si$ is the major constituent, with concentration as great as 60-65 wt. %. The quantity of $Ca_2SiO_4$ conventionally does not exceed 20 wt. %, 30 wt. % or 40 wt. %. The hydration products for $Ca_3O_5Si$ and $Ca_2SiO_4$ are calcium silicate hydrate ($Ca_2H_2O_5Si$) and calcium hydroxide ($Ca(OH)_2$), also known as Portlandite. The calcium silicate hydrate commonly called CSH gel has a variable C:S and H:S ratio depending on the temperature, calcium concentration in the aqueous phase, and the curing time. The CSH gel comprises +/−70 wt. % of fully hydrated Portland cement at ambient conditions and is considered the principal binder of hardened cement. Upon contact with water, the gypsum may partially dissolve, releasing calcium and sulphate ions to react with the aluminate and hydroxyl ions to form a calcium trisulphoaluminate hydrate (known as the mineral ettringite ($Ca_6Al_2(SO_4)_3(OH)_{12}.26H_2O$)). The ettringite will precipitate onto the $Ca_3O_5Si$ surfacesr, thereby preventing further rapid hydration. The gypsum is gradually consumed and the ettringite continues to precipitate until the gypsum is consumed. The sulphates ion concentration will decrease and the ettringite will become unstable converting to calcium monosulphoaluminate hydrate ($Ca_4Al_2O_6(SO_4).14H_2O$). The remaining unhydrated $Ca_3O_5Si$ will form calcium aluminate hydrate.

The cured cement may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, or combinations of these. The cement precursor material may include Portland cement, siliceous fly ash, calcareous fly ash, slag cement, silica fume, or combinations of any of these.

The cured cement may exhibit self-healing characteristics. Specifically, the cured cement may swell in the presence of at least one of diesel, xylenes, aromatics, and chloroform, thereby self-healing any fractures present in the cured cement. The block copolymer composition of the cured cement may swell from 500% to 2000%, from 500% to 1600%, from 500% to 1500%, from 500% to 1100%, from 500% to 1000%, from 500% to 900%, from 500% to 700%, from 700% to 2000%, from 700% to 1600%, from 700% to 1700%, from 700% to 1100%, from 700% to 1000%, from 700% to 900%, from 900% to 2000%, from 900% to 1600%, from 900% to 1500%, from 900% to 1100%, from 900% to 1000%, from 1000% to 2000%, from 1000% to 1600%, from 1000% to 1500%, from 1000% to 1100%, from 1100% to 2000%, from 1100% to 1600%, from 1100% to 1500%, from 1500% to 2000%, from 1500% to 1600%, or from 1600% to 2000%.

Compressive strength is the resistance of a material to breaking under compression. A material with a greater compressive strength suffers less fracturing at a given pressure as compared to a material with a lesser compressive strength. Greater compressive strength is desirable for cured cements in a wellbore, as the cured cement is less likely to fracture in downhole conditions, where pressure may be greater than 20 psi, 200 psi, 500 psi, 1000 psi, 2000 psi, 3000 psi, 5000 psi, 7000 psi, or 10000 psi. The cured cement of the present disclosure may have a compressive strength of from 3500 to 6000 psi, from 3500 to 5500 psi, from 3500 to 5200 psi, from 3500 to 5000 psi, from 3500 to 4700 psi, from 3500 to 4500 psi, from 3500 to 4100 psi, from 4000 to 6000 psi, from 4000 to 5500 psi, from 4000 to 5200 psi, from 4000 to 5000 psi, from 4000 to 4700 psi, from 4000 to 4500 psi, from 4500 to 6000 psi, from 4500 to 5500 psi, from 4500 to 5200 psi, from 4500 to 5000 psi, from 4500 to 4700 psi, from 4700 to 6000 psi, from 4700 to 5500 psi, from 4700 to 5200 psi, from 4700 to 5000 psi, from 5000 to 6000 psi, from 5000 to 5500 psi, from 5000 to 5200 psi, or from 4000 to 5200 psi, meaning that the cured cement will not fracture until its compressive strength has been exceeded.

Tensile strength is the resistance of a material to breaking under tension. A material with a greater tensile strength suffers less fracturing at a given tension as compared to a material with a lesser tensile strength. The cured cement of the present disclosure may have a tensile strength of from 300 to 600 psi, from 300 to 550 psi, from 300 to 525 psi, from 300 to 500 psi, from 300 to 450 psi, from 450 to 500 psi, from 450 to 525 psi, from 480 to 520 psi, from 450 to 550 psi, from 450 to 600 psi, from 500 to 525 psi, from 500 to 550 psi, from 500 to 600 psi, from 525 to 550 psi, from 525 to 600 psi, or from 550 to 600 psi, meaning that the cured cement will not fracture until its tensile strength has been exceeded.

An elastic modulus measures a material's resistance to being deformed elastically, or non-permanently, when a stress is applied to it. The elastic modulus of an object is defined as the slope of its stress-strain curve in the elastic deformation region. A stiffer material will have a greater elastic modulus. The equation for an elastic modulus has the generic form:

$$\lambda = \frac{stress}{strain} \qquad \text{EQUATION 2}$$

where stress is the force causing the deformation divided by the area to which the force is applied and strain is the ratio of the change in some parameter caused by the deformation to the original value of the parameter. The cured cement of the present disclosure may have an elastic modulus of from $1.5 \times 10^6$ to $2.5 \times 10^6$ psi, $1.5 \times 10^6$ to $2.0 \times 10^6$ psi, from $1.75 \times 10^6$ to $2.5 \times 10^6$ psi, from $1.75 \times 10^6$ to $2.0 \times 10^6$ psi, from $1.75 \times 10^6$ to $1.95 \times 10^6$ psi, from $1.75 \times 10^6$ to $1.9 \times 10^6$ psi, from $1.75 \times 10^6$ to $1.85 \times 10^6$ psi, from $1.85 \times 10^6$ to $2.5 \times 10^6$ psi, from $1.85 \times 10^6$ to $2.0 \times 10^6$ psi, from $1.85 \times 10^6$ to $1.95 \times 10^6$ psi, from $1.85 \times 10^6$ to $1.9 \times 10^6$ psi, from $1.9 \times 10^6$ to $2.5 \times 10^6$ psi, from $1.9 \times 10^6$ to $2.0 \times 10^6$ psi, or from $1.9 \times 10^6$ to $1.95 \times 10^6$ psi.

In some embodiments, the cement slurry may contain water and may be water-based. As such, the cement slurry may by hydrophilic, forming stronger bonds with water-wet surfaces. Well sections drilled with non-aqueous drilling fluids may have oil-wet surfaces, resulting in poor bonding between the well and the cement slurry, as oil and water naturally repel. Poor bonding may lead to poor isolation and a buildup of unwanted casing-casing or tubing-casing annular pressure. Without being bound by theory, it is desirable to make the subsurface formation or casing water wet to enhance and improve the bonding between cement and casing and cement and subsurface formation. If the wettability of the subsurface formation or casing is oil wet not water wet then the bonding will be poor and could result in small gap(s) or channel(s) between the cement and casing or the cement and subsurface formation thereby resulting in improper wellbore isolation. This improper wellbore isolation could lead to fluid or gas escaping from the well through this gas or channel due to de-bonding.

EXAMPLES

The following examples illustrate features of the present disclosure but are not intended to limit the scope of the disclosure.

Example 1

In this study, two linear styrene-b-(ethyelene-co-butylene)-b-styrene (SEBS) block copolymers with succinic anhydride grafted onto the soft segment were crosslinked and added to cement compositions. The SEBS block copolymers are commercially available from Kraton Corporation as Kraton™ FG 1901 and Kraton™ FG 1924, the properties of which are listed in Table 1. These SEBS block copolymers contained polystyrene as the hard segment end blocks, ethylene/butene copolymer as the soft segment, and has been grafted with about 2 wt. % maleic anhydride. The catalytic hydrogenation of maleic anhydride results in succinic anhydride. A styrene-b-(ethylene-propene)-b-styrene block copolymer without maleic anhydride is available as experimental product Kraton™ MD 8703 (EDF 10238). MD 8703 was used to evaluate the effect of the anhydride groups in improving the mechanical properties of the cement. The ethylene-propene segment was derived by hydrogenation of styrene-isoprene-styrene block copolymer.

TABLE 1

Block copolymer properties.

| Property | FG 1901 | FG 1924 |
|---|---|---|
| Styrene/rubber (wt.%) | 30/70 | 13/87 |
| Relative Molecular Weight (MW) | Low | Medium |
| -MW of each styrene segment | 7500 | 13125 |
| -MW of rubber segment | 37500 | 202000 |
| Bound succinic Anhydride (wt.%) | 1.4-2.0 | 1 |
| Glass Transition Temperature, ° F. | −43.6 | −40 |
| Melt Flow Index (g/10 min) at 230° C. (ASTM D1238) | 22 | 40 |
| % Elongation at Break | 500 | 750 |
| Physical Form | Powder (Dusted with inorganic powder to prevent particle adhesion) | Powder (Dusted with inorganic powder to prevent particle adhesion) |
| Particle size | $D_{50}$ - 410 μm; $D_{10}$ - 276 μm; $D_{90}$ - 1350 μm; | $D_{50}$ - 360 μm; $D_{10}$ - 260 μm; $D_{90}$ - 510 μm |
| Solid-Liquid Transition Temperature Range, ° F. | 215 | |

$^{13}$C nuclear magnetic resonance (NMR) and $^1$H NMR spectra of the three samples clearly indicated that the spectral pattern of the aromatic region of the spectra due the polystyrene segments was identical for each of MD 8703, FG 1901, and FG 1924, indicating that the succinic anhydride group was grafted onto the soft segment, which indicates regioselective substitution of the succinic anhydride group. Without intending to be limited by theory, it is believed that the succinic anhydride groups are chemoselectively substituted on secondary and tertiary carbons only. This is due to the abundance of methylene groups and methane groups in middle segment (compared to the amount of methyl groups), and the stability of secondary and tertiary radicals during the free radical initiated grafting of the succininic anhydride precursor (specifically, maleic anhydride).

The general structures of aminosilanes that are suitable for crosslinking the SEBS block copolymer are shown in Formula 2 and Formula 3. Specific examples of aminosilanes used in the study include 3-(2-aminoethylaminopropyl)trimethoxysilane and 3-aminopropyltriethoxysilane.

$$NH_2\text{—}(CH_2)_p\text{—}SiR_n(OR^1)_{3-n} \quad \text{Formula 2}$$

$$NH_2\text{—}(CH_2)_m\text{—}NH\text{—}(CH_2)_o\text{—}SiR_n(OR^1)_{3-n} \quad \text{Formula 3}$$

The crosslinking reactions were performed on 100 g each of FG 1901 and FG 1924 by dropwise addition of the aminosilane. The amounts of aminosilane added are shown in Table 2. The crosslinked block copolymers were then rolled in a roller oven maintained at 180° F. for 3-4 hrs to obtain the product as a loose particulate material. 1 wt. % 3-(2-aminoethylaminopropyl)trimethoxysilane was added to FG 1901, which resulted in the FG 1901 Modified 1 sample. 1 wt. % 3-(2-aminoethylaminopropyl)trimethoxysilane was added to FG 1924, which resulted in the FG 1924 Modified 2 sample. 1.4 wt. % 3-aminopropyltriethoxysilane was added to FG 1924, which resulted in the FG 1924 Modified 3 sample.

TABLE 2

Amount of crosslinker added to each block copolymer.

| Sample Name | Block Copolymer | 3-(2-aminoethyl-aminopropyl) trimethoxysilane | 3-aminopropyl-triethoxysilane |
|---|---|---|---|
| FG1901 - Modified 1 | FG 1901 | 1 g/100 g block copolymer | — |
| FG 1924 - Modified 2 | FG 1924 | 1.3g/100 g block copolymer | — |
| FG 1924 - Modified 3 | FG 1924 | — | 1.4 g/100 g block copolymer |

After the crosslinking reactions were performed, the properties of the modified, crosslinked block copolymers were determined. These properties are shown in comparison to the original block copolymers in Table 3.

TABLE 3

Crosslinked block copolymer properties compared to original block copolymer properties.

| Property | FG 1901 | FG 1901 Modified 1 | FG 1924 | FG 1924 Modified 2 | FG 1924 Modified 3 |
|---|---|---|---|---|---|
| Styrene/rubber (wt.%) | 30/70 | 30/70 | 13/87 | 13/87 | 13/87 |
| Relative Molecular weight (MW) | Low | Low | Medium | Medium | Medium |
| -MW of each styrene segment | 7500 | 7500 | 13125 | 13125 | 13125 |
| -MW of rubber segment | 37500 | 37500 | 202000 | 202000 | 202000 |
| Bound succinic Anhydride (wt.%) | 1.4-2.0 | <1.4-2.0 | 1 | <1 | <1 |
| Glass Transition Temperature, °F | −43.6 | Not measured | −40 | Not measured | Not measured |
| Melt Flow Index (g/10 min) at 230° C. (ASTM D1238) | 22 | Not measured | 40 | Not measured | Not measured |
| % Elongation at Break | 500 | Not measured | 750 | Not measured | Not measured |
| Physical Form | Powder (Dusted with inorganic powder to prevent particle adhesion) | Powder (dusting was retained from the parent sample) | Powder (Dusted with inorganic powder to prevent particle adhesion) | Powder (dusting was retained from the parent sample) | Powder (dusting was retained from the parent sample) |
| Particle size | $D_{50}$ - 410 μm; $D_{10}$ - 276 μm; $D_{90}$ - 1350 μm | $D_{50}$ - 376 μm; $D_{10}$ - 250 μm; $D_{10}$ - 480 μm | $D_{50}$ - 360 μm; $D_{10}$ - 260 μm; $D_{10}$ - 510 μm | $D_{50}$ - 880 μm; $D_{10}$ - 445 μm; $D_{10}$ - 1765 μm | $D_{50}$ - 280 μm; $D_{10}$ - <1 μm; $D_{10}$ - 420 μm |
| Solid-Liquid Transition Temperature Range, °F. | 215 | — | — | — | — |

Cement slurries comprising each of the samples were then prepared according to API Recommended procedures by adding a blend of 713 grams API Class G Portland cement, 37 grams (5.2% BWOC) of crosslinked block copolymer and 0.3 grams of a copolymer of N,N-dimethylacrylamide and sodium 2-acrylamido-2-methyl propane sulfonate to 324 milliLiters mix water containing a defoamer.

A control slurry was prepared by mixing 713 grams API Class G Portland cement, 37 grams MD 8703, and 1 gram hydroxyethyl cellulose with 400 grams of water, cured and tested as described previously. A comparative slurry with no block copolymer was also prepared by mixing 800 grams API Class G Portland cement with 424 grams water and 1 gram hydroxyethyl cellulose.

The block copolymer slurry densities were designed to have densities of about 15.0 ppg. The slurries were poured into 2"×5" brass molds and cured at 180° F. under a pressure of 3000 psi for 4 days. The curing chamber was gradually depressurized after the heat was turned off. The cement cylinders were trimmed to obtain 2"×4" cylinders. The densities of the set cement samples containing block copolymers ranged from 14.6 to 15.0 ppg with no density segregation, indicating no cement settling or block copolymer separation.

Compressive strengths and elastic moduli were measured on the 2"×4" cement cylinders. Tensile strengths were measured using the split cylinder method with 2"×1" cement discs. The compressive strengths were measured by a Forney strength tester equipped with 250,000 pound load cell. The rate of pressurization for the compressive strength measurements was 266 pounds force per second (lb$_f$/s), and the rate of pressurization for the split cylinder tensile strength measurements was 33 lb$_f$/s. Self-healing of the cement compositions was measured by testing the fractured cylinders and cylindrical discs from compressive and tensile strength measurements. The cylinders and discs were wrapped individually in aluminum foil, and clamped with C-Clamps or adjustable ring clamps such that the fractured pieces were held together tightly. The cylinders and discs were placed in an oven at 200° F. for two days. The strength of adhesion was tested by manually attempting to break them apart for cylindrical discs and by measuring residual compressive strengths for the cylinders. The cyclic stress measurements were measured by cutting 2 inch by 4 inch cylinders into two equal cylindrical halves, followed by measuring the compressive strength of one cylinder, and using the strength values to set up the equipment for cyclic stress loading/unloading tests. The sample was subjected to cyclical stress loading and unloading between 90% and 20% of the compressive values of the other half. The compression was increased by 5 lb$_f$ at the end of every cycle. The number of cycles the sample withstood prior to failure was measured. The results are shown in Table 4.

Furthermore, the example embodiment cement compositions result in an improved cyclic stress resistance of the cement composition in comparison to the other samples. Therefore block copolymers comprising hard end segments and soft middle segments with regioselective and chemoselective succinic anhydride groups will provide, upon crosslinking with aminosilanes prior to the addition of the block copolymer to cement compositions, improved strength values and cyclic stress resistance while retaining self-healing properties both in the presence and in the absence of swelling solvents.

Example 2

The swelling of the various block copolymer samples in various solutions is shown in Table 5. The solutions were

TABLE 4

Cured cement properties.

| Property | MD 8703 Control | Comparative Cement with FG 1901 | Example Embodiment Cement with FG 1901 Modified 1 | Comparative Cement with FG 1924 | Example Embodiment Cement with FG 1924 Modified 2 | Example Embodiment Cement with FG 1924 Modified 3 |
|---|---|---|---|---|---|---|
| Density (ppg) | 15.5 | 15 | 15 | 15 | 15 | 15 |
| Compressive Strength, psi | 3750 | 4590 | 4685 | 3790 | 5190 | 4050 |
| Tensile Strength, psi | 240 | 420 | 500 | 400 | 505 | 500 |
| Elastic modulus, psi | $1.88 \times 10^6$ | $1.74 \times 10^6$ | $1.95 \times 10^6$ | $1.59 \times 10^6$ | $1.85 \times 10^6$ | $1.87 \times 10^6$ |
| Compressive strength of self-healed samples, psi | Not applicable | 1500 (average of 2 samples) | 400 (average of 2 samples) | 1415 (average of 2 samples) | 810 (average of 2 Samples) | — |
| % Compressive strength retained after self-healing | Not applicable | 33% | 9.0% | 37% | 16% | — |
| Number of Pressure cycles/ Number of samples tested | 1/3 | 1/1; 27/1 | 42/1 | 5/1; 182/1 | 260/1 | 437/1; >618/1 (sample did not break) |

Table 4 shows that self-healing ability of cement composition is significantly decreased when the succinic anhydride substituted block copolymers are crosslinked with aminosilanes. This is likely due to the crosslinking preventing complete melting of the block copolymer, which prevents the molten block copolymer from migrating into the fractures. However, the softening of the polystyrene phase to greater than the glass transition temperature allows the block copolymer to soften enough to deform sufficient to partially bridge the fractured surfaces.

Surprisingly, the results in Table 4 indicate that the elastic modulus, compressive strengths and tensile strengths are increased in the example embodiment cement compositions as compared to the cement compositions including non-crosslinked block copolymers. This is in contrast to the results when using conventional elastomers, such as ground automobile rubber powders. These conventional elastomers cause a significant decrease in compressive, tensile and flexural strength values, as well as elastic modulus, in a cement composition.

diesel, chloroform, xylenes and Aromatic 200. Aromatic 200 was produced by CISCO Chemicals and included from 50 to 85 wt. % C11 to C14 aromatic hydrocarbons, from 5 to 20 wt. % naphthalene, from 5 to 15 wt. % C10 aromatic hydrocarbons not including naphthalene, and from 5 to 15 wt. % C15 to C16 aromatic hydrocarbons. The swelling was measured by adding about 10 ml of solution to 0.26 g crosslinked copolymer and storing the mixture at room temperature for a minimum of 4 hrs. The excess solvent was removed by decanting, and the swollen rubber solid was blotted with a paper towel and weighed. The weight was divided by dry weight and multiplied by 100 to determine the percentage of swelling. The tests including FG1901 Modified 1 and FG 1924 Modified 2 in aromatic 200 solvent were not conducted, and the test including FG 1924 Modified 3 in xylenes solvent was not conducted. The results of the tests conducted are shown in Table 5.

TABLE 5

Block copolymer swelling and dissolving properties in various solvents.

| Solvent | FG1901 | FG 1901 Modified 1 | F 1924 | FG 1924 Modified 2 | FG 1924 Modified 3 |
|---|---|---|---|---|---|
| Diesel | Dissolves | 680% | Dissolves | 1060% | 1020% |
| Xylenes | Dissolves | 700% | Dissolves | 930% | Not determined |
| Aromatic 200 | Dissolves | Not determined | Dissolves | Not determined | 825% |
| Chloroform | Dissolves | 1040% | Dissolves | 1570% | 1460% |

The results in Table 5 show that the FG 1901 Modified 1 and FG 1924 Modified 2 samples both swell in diesel, xylenes, and chloroform. The FG 1924 Modified 3 sample swells in diesel, aromatic 200, and chloroform. Therefore, without intending to be bound by theory, it is likely that cement compositions including these samples would also swell in the presence of these solutions. Therefore, by injecting suitable solvents, with properties similar to the solutions used in this experiment, into fractures in cured cement, the fractures may be sealed effectively due to expected swelling in the cement.

The following description of the embodiments is illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A cement slurry comprising:
    water;
    a cement precursor material; and
    a block copolymer composition having at least one copolymer backbone, each copolymer backbone comprising at least two hard segments, and a soft segment disposed between the at least two hard segments, in which the copolymer backbone has at least one anhydride group grafted onto the soft segment, and in which the anhydride group is crosslinked by an aminosilane crosslinker.

2. The cement slurry of claim 1, in which the hard segments comprise at least one aromatic moiety.

3. The cement slurry of claim 1, in which the hard segments comprise the polymerized product of at least one monomer selected from styrene, alpha-methyl styrene, methacrylate, polyamide, and polyamine.

4. The cement slurry of claim 1, in which the hard segments are end blocks.

5. The cement slurry of claim 1, in which the soft segment is aliphatic.

6. The cement slurry of claim 1, in which the soft segment comprises the polymerized product of one of more monomers selected from butene, ethylene, ethylene oxide, propylene oxide, and acrylic acid.

7. The cement slurry of claim 1, in which the soft segment is unsaturated.

8. The cement slurry of claim 1, in which the block copolymer having the grafted anhydride group comprises the formula

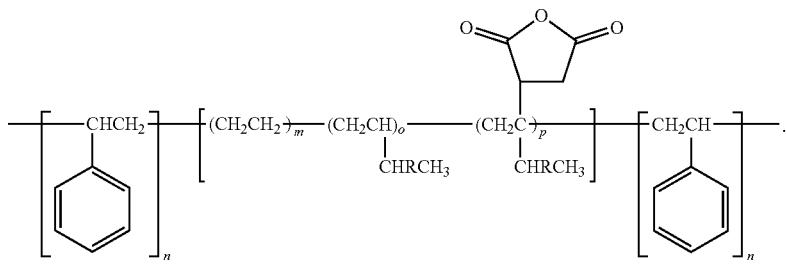

9. The cement slurry of claim 1, in which the block copolymer comprises styrene-ethylene-butylene-styrene (SEBS) block copolymer.

10. The cement slurry of claim 1, in which the block copolymer has an A-B-A structure, in which A and B are two compositionally distinct sub-units.

11. The cement slurry of claim 1, in which the anhydride group comprises a succinic anhydride group, a maleic anhydride group, or combinations of these.

12. The cement slurry of claim 1, in which the anhydride group is grafted onto one of a secondary carbon or a tertiary carbon of the soft segment.

13. The cement slurry of claim 1, in which the aminosilane comprises 3-(2-aminoethylaminopropyl)trimethoxysilane, 3-aminopropyltriethoxysilane, or combinations of these.

14. The cement slurry of claim 1, in which the block copolymer composition comprises from 0.5 to 2 wt. % crosslinker and from 1.4 to 2 wt. % anhydride group.

15. The cement slurry of claim 1, in which the cement slurry comprises from 3% to 7% block copolymer by weight of cement precursor (BWOC).

16. The cement slurry of claim 1, in which the cement slurry has a compressive strength of from 4000 to 5200 psi when cured.

17. The cement slurry of claim 1, in which the cement slurry has an elastic modulus of from $1.5 \times 10^6$ to $2.0 \times 10^6$ psi when cured.

18. The cement slurry of claim 1, in which the cement precursor material comprises one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), hexavalent chromium, trivalent chromium, calcium aluminate, quartz, or combinations of these.

19. The cement slurry of claim 1, in which the cement slurry contains from 0.1 to 10 wt. % BWOC of one or more additives selected from the group consisting of accelerators, retarders, extenders, suspending agents, weighting agents, fluid loss control agents, lost circulation control agents, surfactants, antifoaming agents, or combinations of these.

20. The cement slurry of claim 1, in which the cement precursor material comprises Portland cement precursor, siliceous fly ash, calcareous fly ash, slag cement, silica fume, quartz, or combinations of these.

\* \* \* \* \*